(12) United States Patent
Shore et al.

(10) Patent No.: US 8,445,402 B2
(45) Date of Patent: May 21, 2013

(54) PREFERENTIAL OXIDATION CATALYST CONTAINING PLATINUM, COPPER AND IRON

(75) Inventors: Lawrence Shore, Edison, NJ (US); Robert J. Farrauto, Princeton, NJ (US)

(73) Assignee: BASF Corporation, Florham Park, NJ (US)

( * ) Notice: Subject to any disclaimer, the term of this patent is extended or adjusted under 35 U.S.C. 154(b) by 1200 days.

(21) Appl. No.: 11/142,580

(22) Filed: Jun. 1, 2005

(65) Prior Publication Data

US 2006/0276332 A1  Dec. 7, 2006

(51) Int. Cl.
*B01J 23/72* (2006.01)
*B01J 23/70* (2006.01)
*B01J 8/00* (2006.01)
*B01D 53/14* (2006.01)
*B01D 53/56* (2006.01)
*B01D 53/94* (2006.01)
*C01B 31/18* (2006.01)
*C10K 1/00* (2006.01)

(52) U.S. Cl.
USPC ............ 502/331; 502/345; 423/246; 423/247

(58) Field of Classification Search
USPC ................. 502/325, 327, 326, 330, 334, 336, 502/344, 345, 300, 331, 338, 339, 414, 415; 423/210, 246, 247
See application file for complete search history.

(56) References Cited

U.S. PATENT DOCUMENTS

| | | | |
|---|---|---|---|
| 3,111,396 A | 11/1963 | Ball | 25/156 |
| 4,492,769 A | 1/1985 | Blanchard et al. | 502/262 |
| 4,492,770 A | 1/1985 | Blanchard et al. | 502/304 |
| 4,621,071 A | 11/1986 | Blanchard et al. | 502/302 |
| 4,970,128 A * | 11/1990 | Itoh et al. | 429/42 |
| 6,548,034 B2 | 4/2003 | Takamura et al. | 423/247 |
| 6,559,094 B1 * | 5/2003 | Korotkikh et al. | 502/326 |
| 2002/0122764 A1 | 9/2002 | Shore et al. | 423/437.2 |
| 2003/0175562 A1 | 9/2003 | Taguchi et al. | 429/19 |
| 2006/0276332 A1 * | 12/2006 | Shore et al. | 502/326 |

FOREIGN PATENT DOCUMENTS

| WO | WO 03/051493 A2 | 6/2003 |
|---|---|---|
| WO | WO 2004/058634 A2 | 7/2004 |
| WO | WO 2004058634 A2 * | 7/2004 |
| WO | WO 2005/070537 A1 | 8/2005 |

* cited by examiner

*Primary Examiner* — Kaj K Olsen
*Assistant Examiner* — Jennifer Smith
(74) *Attorney, Agent, or Firm* — Anna-Lisa Gallo

(57) ABSTRACT

An improved catalyst suitable as a preferential oxidation catalyst is obtained by adding platinum, copper, and iron to a support.

17 Claims, 15 Drawing Sheets

PREFERENTIAL OXIDATION CATALYST CONTAINING PLATINUM, COPPER AND IRON

FIELD OF THE INVENTION

This invention relates to the preparation of catalytic material for use in the selective oxidation of carbon monoxide, to catalyst members comprising such materials and to the conditions of their use. The invention finds utility in the preparation of hydrogen-containing gas streams for use in fuel cells, which generate power by the oxidation of hydrogen.

BACKGROUND OF THE INVENTION

A known strategy for the use of fuel cells involves the generation of hydrogen from carbonaceous fuels. Generally, this process involves subjecting the fuel to desulfurization, steam reforming and high- and low-temperature water-gas shift reactions. The resulting gas stream comprises significant quantities of hydrogen ($H_2$), carbon dioxide ($CO_2$), water ($H_2O$) and about 0.5% carbon monoxide (CO). The aforesaid quantity of CO is greater than desired for fuel cell purposes, since CO is known to poison the catalyst for the fuel cell reaction. It is therefore necessary to remove some or all of the CO, e.g., by oxidizing it to $CO_2$, without removing the $H_2$ needed to power the fuel cell. The CO must be removed or reduced to a maximum of about 10 ppm. In a prior art process known under the trade name SELECTOXO™, the product of the water-gas shift reactions is stripped of CO in a catalytic selective oxidation process that avoids oxidation of $H_2$. The commercial SELECTOXO™ catalyst involved comprises from 0.3 to 0.5% platinum and 0.03% iron dispersed on alumina support tablets or pellets by wet impregnation of the alumina with a solution of platinum and iron salts. The SELECTOXO™ catalyst material was dried at not more than 125° C. because it was expected that that catalyst would be used at temperatures not higher than 125° C. and that a higher drying temperature would detrimentally affect the platinum. The catalyzed alumina tablets are typically assembled into a bed through which the feed stream is flowed.

As disclosed in commonly assigned U.S. Pat. No. 6,559,094, the entire content of which is herein incorporated by reference, superior catalytic activity for the selective oxidation of carbon monoxide can be obtained by using a catalyst comprising platinum and iron that have been impregnated onto a support material or monolith which was then dried and calcined under oxidizing conditions, e.g., in air, in the temperature range of from 200° C. to 300° C. The prior art did not recognize the advantage of the use of materials calcined in this range for the selective oxidation processes described therein. The invention as disclosed therein also relates to a method for the preparation of a catalyst and catalytic material and to the products of the method. The method comprises wetting a support material such as alumina (or a monolith of such material) with platinum and iron in solution and calcining the wetted material or monolith in oxidizing conditions, e.g., in air, at temperatures in the range of from 200° C. up to, but not including, 300° C. The loading of platinum on the support material should be in the range of from about 3 to 7 weight percent, preferably about 5 weight percent. The iron loading is roughly proportional to the platinum loading at about six percent thereof, e.g., in the range of from about 0.1 to 0.6 weight percent, preferably about 0.3 weight percent. Loadings of 3 to 5 weight percent platinum and 0.3 weight percent iron on powdered alumina correspond to the platinum and iron content in the surface layer of the prior art SELECTOXO™ catalysts described above. The overall loadings of 0.3 to 0.5 weight percent platinum and 0.03 weight percent iron stated above relative to the SELECTOXO™ catalysts reflect the fact that the SELECTOXO™ tablets contain within their interiors substantial quantities of alumina that are substantially free from catalytic species and which do not have significant contact with feed stream gases.

The literature is replete with other selective oxidation catalysts, but few are robust in a steam environment. George Avgouropoulos et al., Catalysis Letters, 73, 33, 2001, demonstrated a working preferential oxidation (PROX) catalyst based on copper and cerium, with an operating temperature above 140° C. in the presence of 10% steam. The elevated temperature is required to allow the copper to reduce and become active.

Mitsubishi Gas (U.S. Pat. No. 6,548,034) discloses the use of Pt with copper, as well as Pt with Mn, Ni or Co, for a PROX catalyst that is applied to fuel cells. A limiting factor in reducing the concentration of CO is the extent of reverse water gas shift activity of the catalyst. The normal water gas shift reaction is:

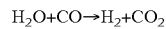

$$H_2O + CO \rightarrow H_2 + CO_2$$

The reverse water gas shift reaction, rWGS, for the reaction going in the opposite direction is:

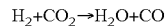

$$H_2 + CO_2 \rightarrow H_2O + CO$$

where poisonous CO gas is produced. The Mitsubishi Gas patent states that the mixture of copper and platinum does not exhibit the reverse water gas shift activity, commonly associated with Pt-containing catalysts in a gas mixture containing $H_2$ and $CO_2$ below 160°0 C. The data, however, in the patent is not believed to support such a conclusion.

SUMMARY OF THE INVENTION

This invention provides a preferential oxidation (PROX) catalyst suitable for PROX application use in fuel cells by adding iron and copper to a catalyst containing Pt. Such a catalyst has been found superior to a similar Pt catalyst only having iron or copper. The improvements found using the catalyst of this invention include decreased amounts of CO made by reverse water gas shift when iron and copper are co-impregnated compared to the catalyst containing only copper or iron added to Pt. Further, rWGS is both kinetically and thermodynamically controlled such that the catalyst containing Fe and Cu can be used at both higher temperature and lower space velocity than comparative catalyst (Pt with Cu and no Fe). The combination of iron and copper with platinum results in extending the operational window to lower temperature. This is particularly evident as the operational space velocity increases. The result of this is the ability to operate the catalyst at a temperature that is not possible when only copper is added to a Pt-containing PROX catalyst.

DETAILED DESCRIPTION OF THE INVENTION

Figure 1:
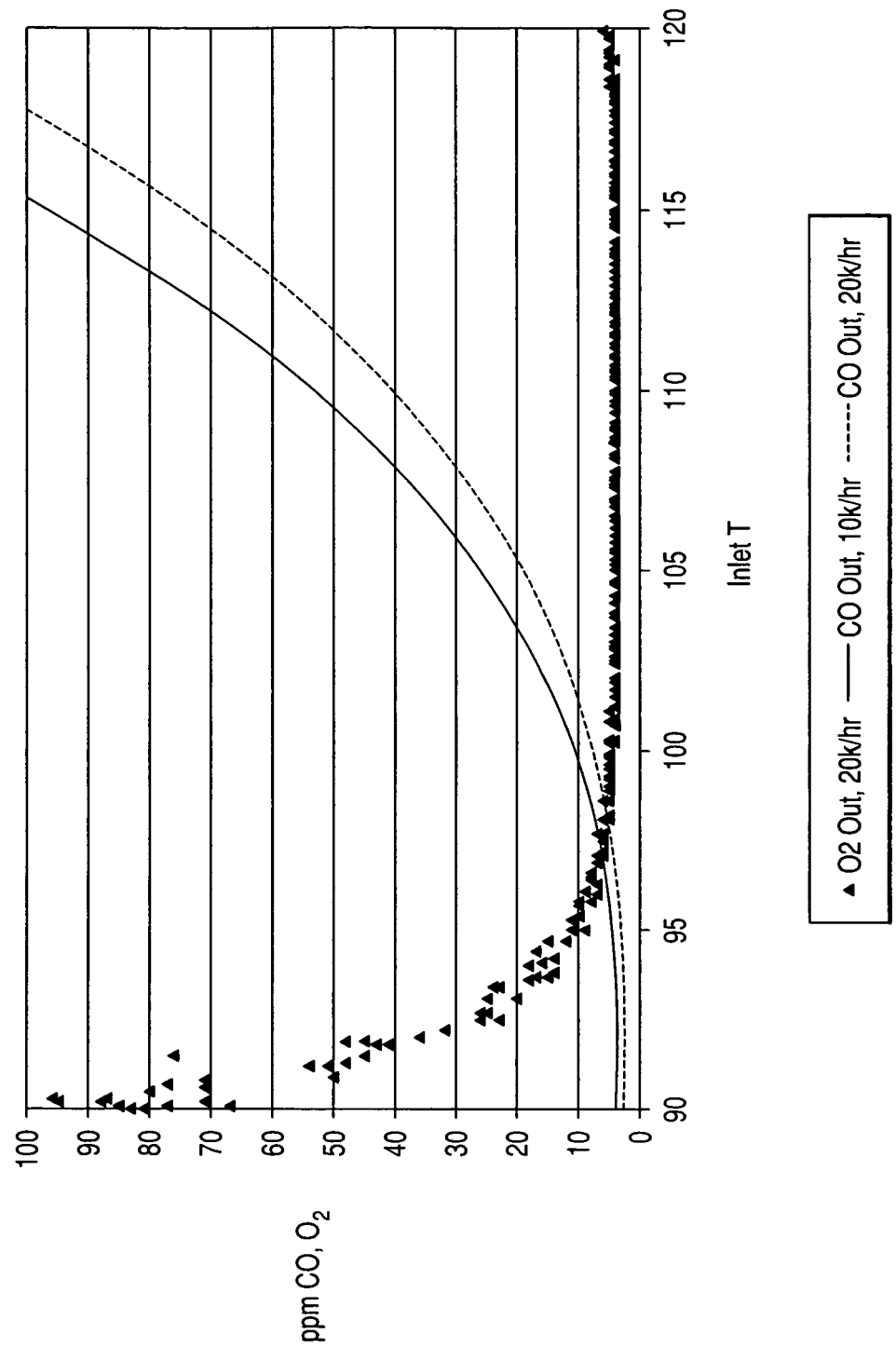
FIG. 1 is a plot of the activity using a PROX catalyst with 2% Pt and 8% Cu showing the CO and $O_2$ out vs. inlet T.

One aspect of the present invention relates to the use of particular catalysts useful for the selective oxidation of carbon monoxide in an oxygen- and hydrogen-containing gas, to a method of preparing such catalysts and to the products of the method. The selective or preferential oxidation of carbon monoxide in a gas stream containing a significant quantity of hydrogen is required in various processes, e.g., for removing carbon monoxide from the gas stream effluent from high- and low-temperature water-gas shift reactions to produce a fuel cell feed stream. Such gas streams typically contain at least 5 percent, preferably at least 10%, more preferably at least 20%, hydrogen by weight and about 0.5% CO. The gas stream for the water-gas shift is typically contacted with a catalytic material prepared in accordance with the present invention at a process temperature lower than about 200° C., often at low or ambient temperature, e.g., 125° C., or lower. The amount of CO in the gas stream is reduced to not more than about 0.001 mole percent, preferable to less than 3 parts per million (ppm). Accordingly, the rate of CO conversion should be at least about 95%, preferably at least about 98%.

An improved preferential oxidation (PROX) catalyst having superior catalytic activity for the selective oxidation of carbon-monoxide can-be obtained by-using a catalyst comprising platinum, copper and iron that have been impregnated onto a support material which is then dried and calcined under oxidizing conditions, e.g., in air, in the temperature range of from 200° C. to 800° C. The performance of this catalyst is superior to a similar Pt catalyst made with only copper or iron being added. The prior art does not recognize the advantage of the use of this three component catalyst for the selective oxidation processes described herein. The present invention also relates to a method for the preparation of a catalyst and catalytic material and to the products of the method.

The catalytic materials described herein are coated onto carrier substrates that may comprise an anchor layer as described herein for adhering the catalytic material to the carrier. In addition, this invention relates to the novel use of a catalyst member comprising a washcoat of catalytic material applied to flow-through monoliths, e.g., to honeycomb monoliths and/or foamed metal monoliths. The use of such monoliths provides greater mechanical stability to the catalytic material than the tablet or granule beds used in the prior art.

A catalytic material is prepared in accordance with one aspect of this invention by dispersing compounds and/or complexes of platinum, copper, and iron onto relatively inert support material. As used herein, the term "compound", as in "platinum compound," "copper compound," or "iron compound" means any compound, complex, or the like of platinum, copper, or iron which, upon calcination or upon use of the catalyst, decomposes or otherwise converts to a catalytically active form, which is often, but not necessarily, an oxide. The compounds or complexes may be dissolved or suspended in any liquid which will wet or impregnate the support material, and which is capable of being removed from the catalyst by volatilization or decomposition upon heating and/or the application of a vacuum. Generally, both from the point of view of economics and environmental aspects, aqueous solutions of soluble compounds or complexes are preferred. For example, suitable water-soluble platinum compounds are chloroplatinic acid and amine solubilized platinum hydroxide; suitable water-soluble copper compounds include $CuCl_2$, $Cu(SO_4)$, $Cu(NO_3)_2$; suitable water-soluble iron compounds include $FeCl_2$, $FeCl_3$, $Fe_2(SO_4)_3$, $Fe(NO_3)_2$, $Fe(NO_3)_3$. The solution of catalytic species impregnated into the pores of the bulk support particles of the catalyst, i.e., the support particles are wetted with the solution, and the wetted or impregnated material is dried and calcined subject to the temperature limitations set forth herein, to remove the liquid and bind the platinum group metal, copper, and iron onto the support material. Wetting the support material with a platinum group metal solution and copper and iron solutions may comprise wetting the support material with a solution containing at least two of platinum, copper, and iron compounds or with separate solutions, one containing a platinum compound, one containing a copper compound, and one containing an iron compound. The wetted support is then dried and calcined and the dissolved platinum group metal, copper, and iron compounds are thus converted into catalytically active forms. An analogous approach can be taken to incorporate other components into the catalytic material. In particular embodiments, the solution contains bivalent platinum ions. For example, the solution may contain $Pt^{II}(NH_3)_4 Cl_2$ and may not be reduced prior to calcination.

Suitable support materials for the catalytic component include alumina, silica, titania, silica-alumina, alumino-silicates, aluminum-zirconium oxide, aluminum-chromium oxide, etc. Such materials may be provided in various forms, but a support material is preferably used in a particulate, high surface area form. For example, gamma-alumina is preferred over alpha-alumina. The support material and therefore the resulting catalytic material are typically used in particulate form with particles in the micrometer-sized range, e.g., 10 to 20 micrometers in diameter, so that they can be formed into a slurry applied as a washcoat onto a carrier member.

The loading of platinum on a particulate support material should be in the range of from about 1 to 5 weight percent, preferably about 1 to 3 weight percent. The copper loading should be from about 2-12 weight percent, and preferably 4-8 weight percent. The iron loading will be from about 0.1-2 weight percent, and preferably from about 0.2-1 weight percent. The metals can be impregnated onto the support sequentially or by co-impregnation of two or more metals typically in the form of water-soluble metal salts or complexes. It has been found that incorporating the iron subsequent to the incorporation of the platinum and copper into the support yields good results.

In optional but preferred embodiments, catalytic material prepared in accordance with this invention is applied as a thin layer, e.g., as a washcoat, onto a carrier member of high surface area, which is believed to enhance contact between the gas stream and the catalytic species. A high surface area carrier member defines numerous apertures, pores, channels or similar structural features that cause liquid and/or gas to flow therethrough in turbulent or substantially non-laminar fashion and give the substrate a high surface area per overall volume of the flow path of the fluid through the substrate, e.g., features that create a high mass transfer zone for the fluid therein. Open substrates may be provided in a variety of forms and configurations, including honeycomb-type monoliths, woven or non-woven mesh, wadded fibers, foamed or otherwise reticulated or lattice-like three-dimensional structures, etc. For gas phase, i.e., fluid phase, reactions, a suitable carrier typically has a plurality of fluid-flow passages extending therethrough from one face of the carrier to another for fluid-flow therethrough. Optionally, a binder layer or etch coat may be applied to the carrier substrate before the catalytic material is coated onto the carrier. The etch coat, which may comprise a refractory inorganic oxide powder, helps the catalytic washcoat adhere to the carrier substrate and is particularly helpful in adhering the washcoat to a smooth metal surface. The etch coat may optionally comprise the same material used as the support material of a particulate catalytic material. An etch coat may not be needed, however, if the substrate surface is rough (e.g., if it is thermally sprayed onto the substrate as described below) or if it adheres well to the catalytic material. For example, an etch coat would be optional for use on a ceramic honeycomb monolith onto which a catalytic material comprising an alumina support material is to be applied, since the alumina is expected to adhere well to the ceramic material. Likewise, when the carrier comprises an aluminum metal substrate, the aluminum substrate may be calcined in air before the catalytic material is applied thereto, to produce on the surface a layer of alumina to which the catalytic material will adhere.

In one conventional carrier configuration that is commonly used for gas phase reactions and is known as a "honeycomb" monolith, the passages are typically essentially (but not necessarily) straight from an inlet face to an outlet face of the carrier and are defined by walls on which the catalytic material is coated so that the gases flowing through the passages contact the catalytic material. The flow passages of the carrier member may be thin-walled channels which can be of any suitable cross-sectional shape and size such as trapezoidal, rectangular, square, sinusoidal, hexagonal, oval, or circular. Such structures may contain from about 60 to about 1000 or more gas inlet openings ("cells") per square inch of cross section ("cpsi"), more typically 200 to 600 cpsi. Such a honeycomb-type carrier monolith may be constructed from metallic substrates in various ways such as, e.g., by placing a corrugated metal sheet on a flat metal sheet and winding the two sheets together about a mandrel. Alternatively, they may be made of any suitable refractory materials such as cordierite, cordierite-alpha-alumina, silicon nitride, zirconium mullite, spodumene, alumina-silica magnesia, zirconium silicate, sillimanite, magnesium silicates, zirconium oxide, petallite, alpha-alumina and alumino-silicates. Typically, such materials are extruded into a honeycomb configuration and then calcined, thus forming passages defined by smooth interior cell walls and a smooth outer surface or "skin".

Foamed metal may provide one species of open substrate for use in the present invention. Methods for making foamed metal are known in the art, as evidenced by U.S. Pat. No. 3,111,396. The use of foamed metal as a carrier for a catalytic material has been suggested in the art. Briefly described, a foamed metal substrate can be formed by a casting process in which a mold is filled with a mixture of metal powder and granules of an expendable, removable material. The sleeve and the metal powder-removable granules mixture therein are sintered. The metal powder forms a porous matrix about the removable granules, which are burned away. The resulting foamed metal substrate is then removed from the mold for finishing. Foamed metal can be characterized in various ways, some of which relate to the properties of the initial organic matrix about which the metal is disposed. Some characteristics of foamed metal substrates recognized in the art include cell size, density, free volume, and specific surface area. For example, the surface area may be 1500 times that of a solid substrate having the same dimensions as the foamed substrate. Foamed metal substrates useful as carriers for catalyst members may have mean cell diameters in the range of 0.5 to 5 mm, and they may have a free volume of from about 80 to 98%, e.g., 3 to 15 percent of the volume occupied by the foamed substrate may constitute metal. The porosity of the substrate may range from 3 to 80 ppi, e.g., from 3 to 30 ppi or from 3 to 10 ppi or, alternatively, from 10 to 80 ppi. In the illustrative range of 10 to 80 ppi, other characteristics such as cells per square inch may range from 100 to 6400 and the approximate web diameter may vary from 0.01 inch to 0.004 inch. Such foams may have open-cell reticulated structures, based on a reticulated/interconnected web precursor. They typically have surface areas that increase with porosity in the range of from about 700 square meters per cubic foot of foam ($m^2/ft^3$) at about 10 ppi to 4000 $m^2/ft^3$ at about 60 ppi, etc. Other suitable foamed metal substrates have surface areas ranging from about 200 square feet per cubic foot of foamed metal ($ft^2/ft^3$) at about 10 ppi to about 1900 $ft^2/ft^3$ at about 80 ppi. One such substrate has a specific weight of 500 $g/m^2$ at a thickness of about 1.6+/−0.2 millimeters with a porosity of 110 ppi. They may have volume densities in the range of 0.1 to 0.3 grams per cubic centimeter (g/cc). Foamed metal sheets can be rolled, layered, etc., to build up a substrate of any desired dimension. Suitable foamed nickel with which the present invention may be practiced is commercially available in extruded sheets about 1.6 millimeters (mm) thick. It may have tensile strengths of at least 3 kilograms per square centimeter ($kg/cm^2$) in the machine direction and 9 percent in the transverse direction. At thicknesses of 1.3 to 2.5 mm, it may have specific weights in the range of 350 to 1000 $g/m^2$ and a pore size of 60 to 110 pores per lineal inch (ppi). One particular material has a specific weight of 500 $g/m^2$ and 80 ppi.

One suitable foamed metal substrate for use with the present invention will have a density of about 6 percent. Foamed metal substrates can be formed from a variety of metals, including iron, titanium, tantalum, tungsten noble metals, common sinterable metals such as copper, nickel, bronze, etc., aluminum, zirconium, etc., and combinations and alloys thereof such as steel, stainless steel, Hastalloy, Ni/Cr, Inconel (nickel/chromium/iron) and Monel (nickel/copper).

Stainless steel foam is a good, low-cost alternative to plate-like substrates and to more expensive alloy foams such as Fecralloy (FeCrAl).

The specific surface area for pure foam metals equals approximately 0.01 to 0.1 $m^2/g$, but that this is insufficient to produce active catalysts for a majority of catalytic processes taking place in the kinetic region. It is therefore recommended to increase the specific surface area by direct deposition on the foamed metal of gamma-alumina having a surface area of 20 to 50 $m^2/g$, although low surface area foamed metals may be used in high temperature external diffusion processes. The present invention teaches instead the thermal spraying such as electric arc spraying of a metal anchor layer preferably comprising nickel aluminide onto the metal foam substrate.

Another species of open substrate may be provided by woven or non-woven wire mesh. A woven wire mesh substrate for use with the present invention may be formed in any suitable weave, e.g., plain, twill, plain Dutch weave, twill Dutch weave, crocheting, etc. Wire mesh is commonly available in weaves that leave from about 18 to 78 percent open area, more typically, from about 30 to 70 percent open area. "Open area" is known in the art as a measure of total mesh area that is open space. Mesh counts (the number of openings in a lineal inch) for such materials vary from two per inch by two per inch (2×2) to 635×635. The mesh may be woven from wires comprising aluminum, brass, bronze, copper, nickel, stainless steel, titanium, etc., and combinations and alloys thereof. A non-woven wire mesh that can be used as an open substrate in accordance with this invention may be made from the same materials as woven mesh. A wire mesh substrate may comprise one or more layers of wire mesh joined together by soldering, welding or any other suitable method.

Any metal substrate used as a carrier monolith in the practice of the present invention may optionally be pre-coated with a binder layer of alumina or another refractory inorganic oxide before the catalytic material is deposited thereon. As an alternative to the binder layer, or optionally in addition thereto, the metal monolith may be calcined in air to produce a surface layer of metal oxide before the catalytic material is deposited thereon. Employing a binder layer and pre-calcining the metal substrate both help to improve the adherence of the catalytic material to the monolith.

The use of catalyst members that comprise catalytic material deposited upon carrier monoliths with such high cell or pore densities as described above allows the use of smaller catalyst members or beds than was previously practicable. In other words, less physical space or volume is needed for a high cell or high pore density catalyst member than was needed for a granular or tableted catalyst bed that achieves the same degree of catalytic activity.

Methods for applying a catalytic washcoat onto carrier substrates, including both open substrates and dense substrates, are well-known in the art.

When catalytic species are deposited onto a carrier, especially onto an open substrate, the amounts of the catalytic species and other components of the catalytic material are often presented based on grams per volume basis, e.g., grams per cubic foot ($g/ft^3$) for platinum group metal components and grams per cubic inch ($g/in^3$) for support material and for the catalytic material as a whole, as these measures accommodate different gas-flow passage configurations in different carriers. In typical embodiments, the loading of catalytic material on a flow-through open carrier substrate for use according to the present invention may be in the range of from about 1 to 3 $g/in^3$ of the catalytic material with the platinum, copper, and iron components therein according to their relative weight percents as described above. The finished catalyst member may be mounted in a metallic canister that defines a gas inlet and a gas outlet and that facilitates flow of the feedstream into contact with the catalyst.

In contrast to an open substrate, a dense substrate (or low surface area substrate), such as a plate, tube, foil and the like, on which the catalytic material of the invention may be deposited as well, has a relatively small surface area per overall volume of the flow path through the substrate regardless of whether it is perforated or not, and do not substantially disrupt laminar flow therethrough.

The invention is not limited to the use of powdered, i.e., particulate, support materials or powdered or particulate catalytic materials. The platinum, copper, and iron catalytic species may be dispersed onto various forms of support materials other than particulate support materials, including, for example, pelletized material as described above for the SELECTOXO™ catalyst, or directly onto a flow-through carrier monolith, e.g., a monolith formed from alumina or another refractory material mentioned above. Accordingly, a catalytic material prepared in accordance with the method of the present invention can be prepared by dispersing the platinum, copper and iron catalytic species onto, e.g., pelletized support material such as pelletized alumina (i.e., alumina tablets). Alternatively, the catalytic species may be dispersed onto a monolith to produce a catalyst member by various methods, e.g., by spraying a solution of compounds of the catalytic species onto the monolith or by immersing the monolith into the solution. (These techniques can also be used to disperse the catalytic species onto particulate support materials.) The wetted monolith is then calcined in accordance with the present invention.

As a result of using the improved three component catalyst the magnitude of the concentration of CO made by reverse water gas shift, rWGS, is decreased when iron and copper are added to platinum compared to the catalyst containing only copper or iron added to platinum. The rWGS is both kinetically and thermodynamically controlled. Thus the Pt catalyst containing Fe and Cu can be used at both higher temperature and lower space velocity than a comparative example where the catalyst has Pt with Cu and no Fe.

Furthermore, the combination of the addition of both iron and copper to the platinum catalyst results in extending the operational window to lower temperatures. This is particularly evident as the operational space velocity increases. The result of this is the ability to operate the catalyst at a temperature that is not possible when only copper is added to a Pt washcoat.

Having described the basic aspects of the invention, the following examples are given to illustrate specific embodiments thereof.

EXAMPLE 1 (COMPARATIVE)

A monolith catalyst was prepared using a washcoat that contained copper and platinum. Alumina powder was impregnated with an amine-stabilized platinum complex to reach a concentration of 2% Pt (w/w), and the platinum was fixed by the addition of acetic acid. The alumina was dried, and then impregnated using sufficient solution of copper nitrate to yield a copper concentration of 8% (w/w). The alumina was re-dried and calcined at 500° C. The alumina was then ball-milled with water until 90% of the particles were <10 μm. The slurry, which contained about 30% solids, was applied to a cylindrical cordierite monolith (400 cpsi, 3 inches long and ¾ inch wide). The expected dry gain was 2 g/in$^3$.

EXAMPLE 2

The process described in Example 1 was repeated, except the washcoat powder was impregnated for a third time using a ferric nitrate solution, the catalyst re-dried and calcined at 300° C. Samples were made with iron at 0.1, 0.25, 0.5, 1.0 and 1.5% (w/w).

EXAMPLE 3 (COMPARATIVE)

For comparative purposes, a catalyst containing iron and platinum was prepared by following the procedures in Example 1. Alumina powder was impregnated with an amine-stabilized platinum complex to reach a concentration of 2% Pt (w/w), and the platinum was fixed by the addition of acetic acid. The alumina was dried, and then impregnated using a solution of ferric nitrate to yield an iron concentration of 1% (w/w). The alumina was re-dried and calcined at 300° C. The alumina was then ball-milled with water until 90% of the particles were <10μ. The slurry, which contained about 30% solids, was applied to a cylindrical cordierite monolith (400 cpsi, 3" long and ¾" wide). The expected dry gain was 2 g/in$^3$.

EXAMPLE 4

The catalyst described in Example 1 was made in the same manner, except that sufficient iron nitrate to yield a final concentration of 1% was added along with the copper nitrate during the impregnation of the washcoat powder. As in Example 1, the catalyst was dried, then calcined at 500° C. Instead of sequential impregnation, this sample is an example of co-impregnation.

EXAMPLE 5

This describes the test procedure. The catalyst core was mounted in a quartz tube and placed in a reactor. The inlet temperature of the catalyst was controlled using a clamshell furnace. The catalyst was conditioned at 120° C. for at least four hours using a reformate containing (on a dry basis) 50% $H_2$, 15% $CO_2$, 0.3% CO, 0.48% $O_2$ and balance nitrogen. Steam was injected into the reformate at 25% v/v. The space velocity was set at 10 k/hr. The inlet temperature of the catalyst was then reduced to 90° C. over a period of four hours. The temperature was then returned to 120° C., and the flow adjusted so that the space velocity was 20 k/hr. The temperature was again reduced to 90° C. over four hours. The two cycles were repeated except that CO flow was stopped and the temperature decrease was achieved in two hours. The latter two runs were used to quantify reverse water gas shift.

Figure 2:
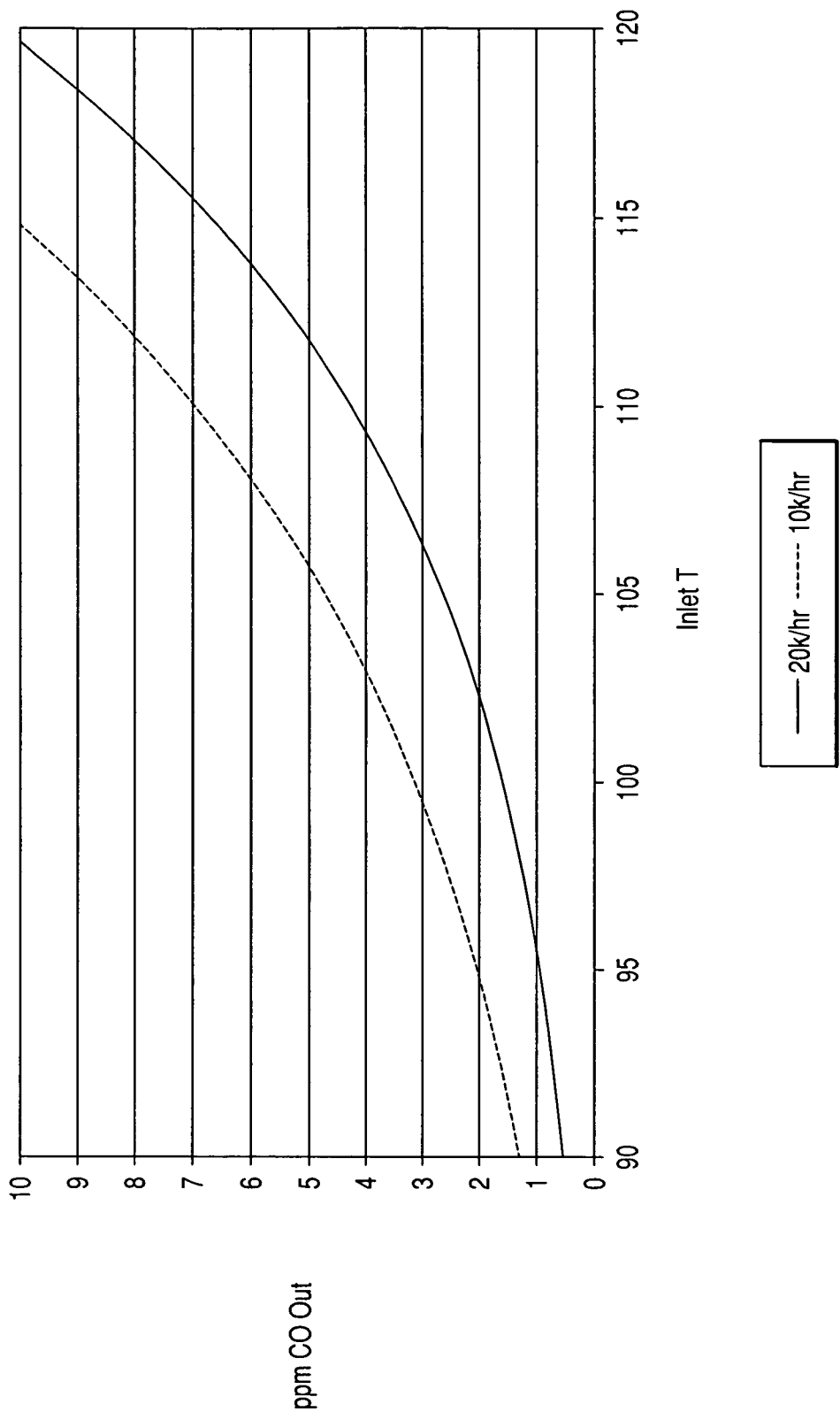
FIG. 2 is a plot of the activity using a PROX catalyst with 2% Pt and 8% Cu showing the reverse WGS of the CO out vs. inlet T.

FIG. 1 shows the outlet CO for 10 and 20 k/hr for the catalyst with 8% copper and 2% platinum (Example 1). The outlet $O_2$ at 20k/hr is also shown. FIG. 2 shows the data for reverse WGS at 10 and 20 k/hr, respectively for the 8% Cu, 2% Pt/alumina catalyst.

EXAMPLE 6

Figure 3:
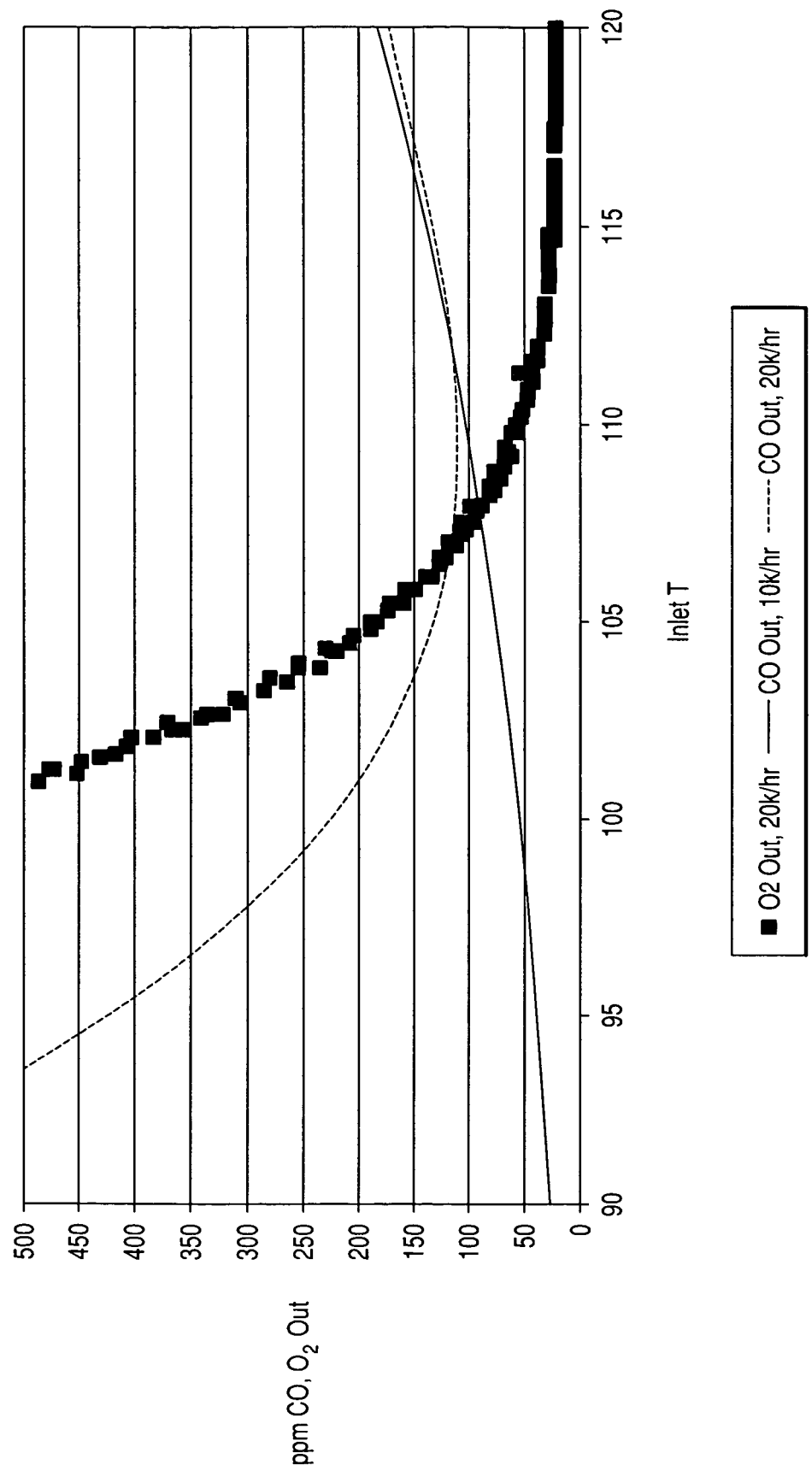
FIG. 3 is a plot of the activity using a PROX catalyst with 2% Pt and 1% Fe showing the CO and $O_2$ out vs. inlet T.
Figure 4:
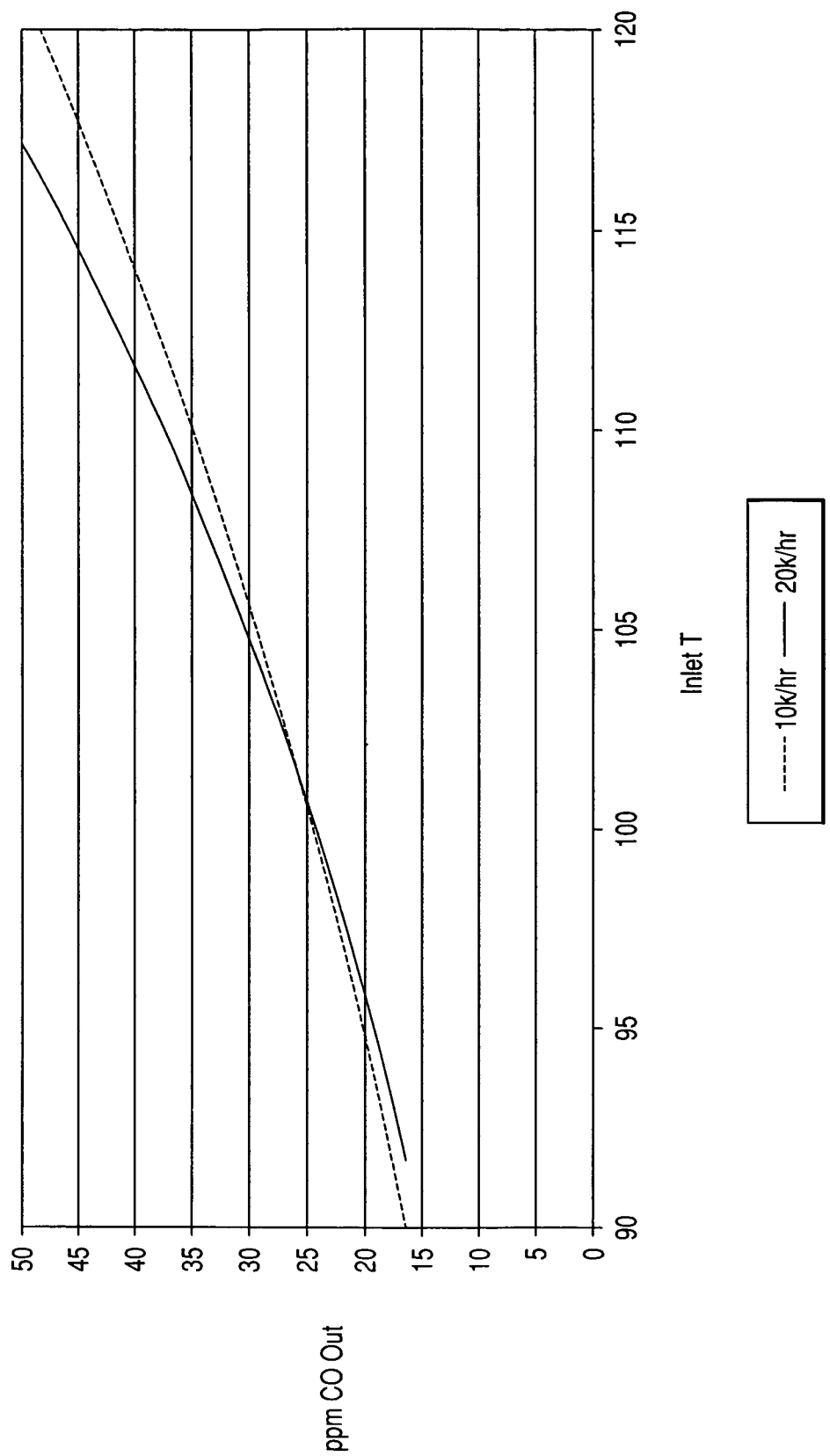
FIG. 4 is a plot of the activity using a PROX catalyst with 2% Pt and 1% Fe showing the reverse WGS of the CO out vs. inlet T.

This comparative experiment repeats the experimental conditions described in Example 5 using a catalyst containing 2% platinum and 1% iron (Example 3). The results for residual CO (and $O_2$ at 20 k/hr) are shown in FIG. 3, and FIG. 4 shows the magnitude of reverse WGS at 10 and 20 k/hr, respectively.

EXAMPLE 7

Figure 5:
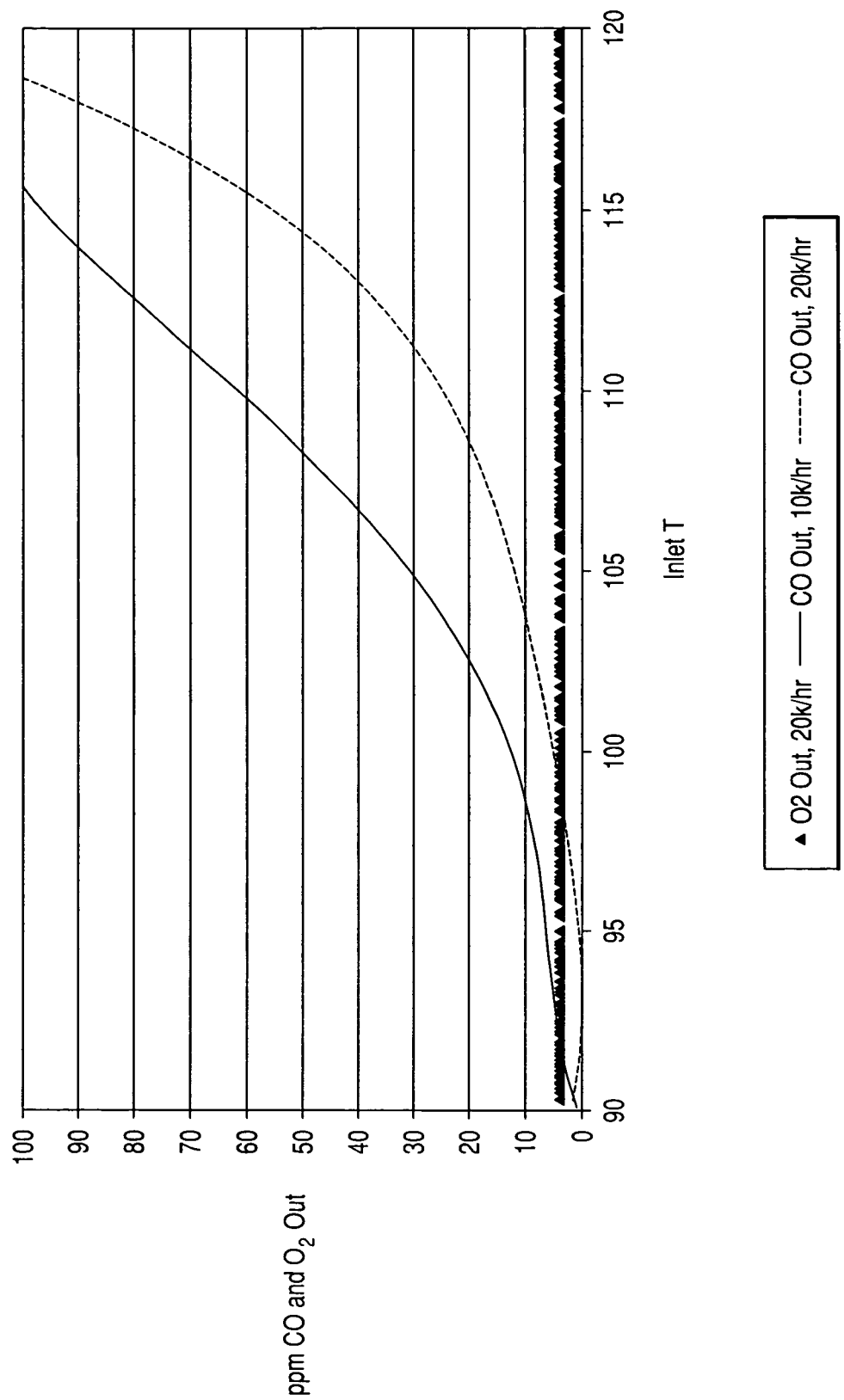
FIG. 5 is a plot of the activity using a PROX catalyst with 2% Pt, 8% Cu and 0.25% Fe showing the CO and $O_2$ out vs. inlet T.
Figure 6:
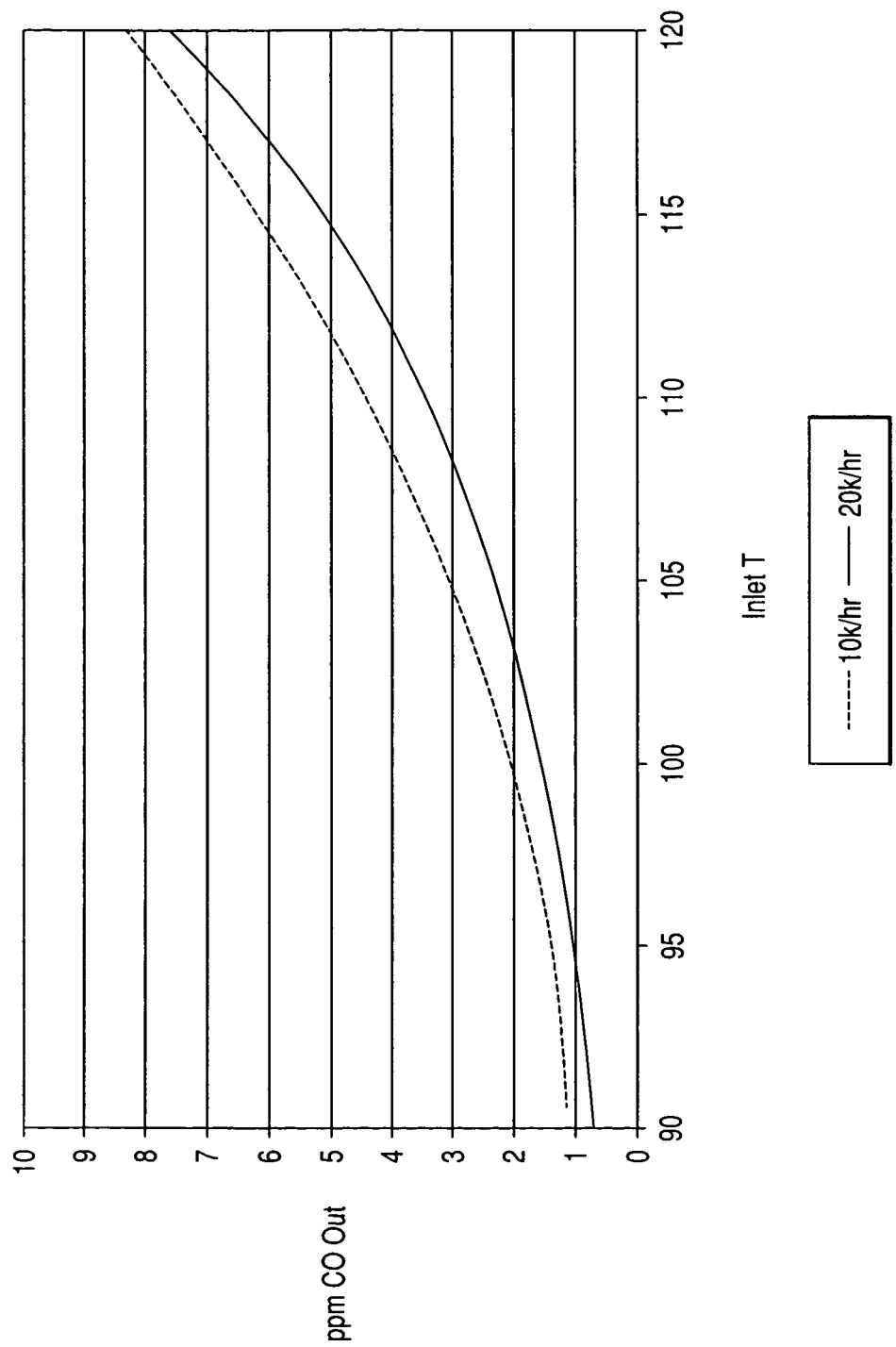
FIG. 6 is a plot of the activity using a PROX catalyst with 2% Pt, 8% Cu and 0.25% Fe showing the reverse WGS of the CO out vs. inlet T.

The experimental conditions described in Example 5 were repeated. The experiment was performed using the catalyst containing 8% copper and 0.25% iron with 2% platinum (Example 2). The results for residual CO (and $O_2$ at 20 k/hr) are shown in FIG. 5. FIG. 6 shows the magnitude of reverse WGS at 10 and 20 k/hr, respectively.

EXAMPLE 8

Figure 7:
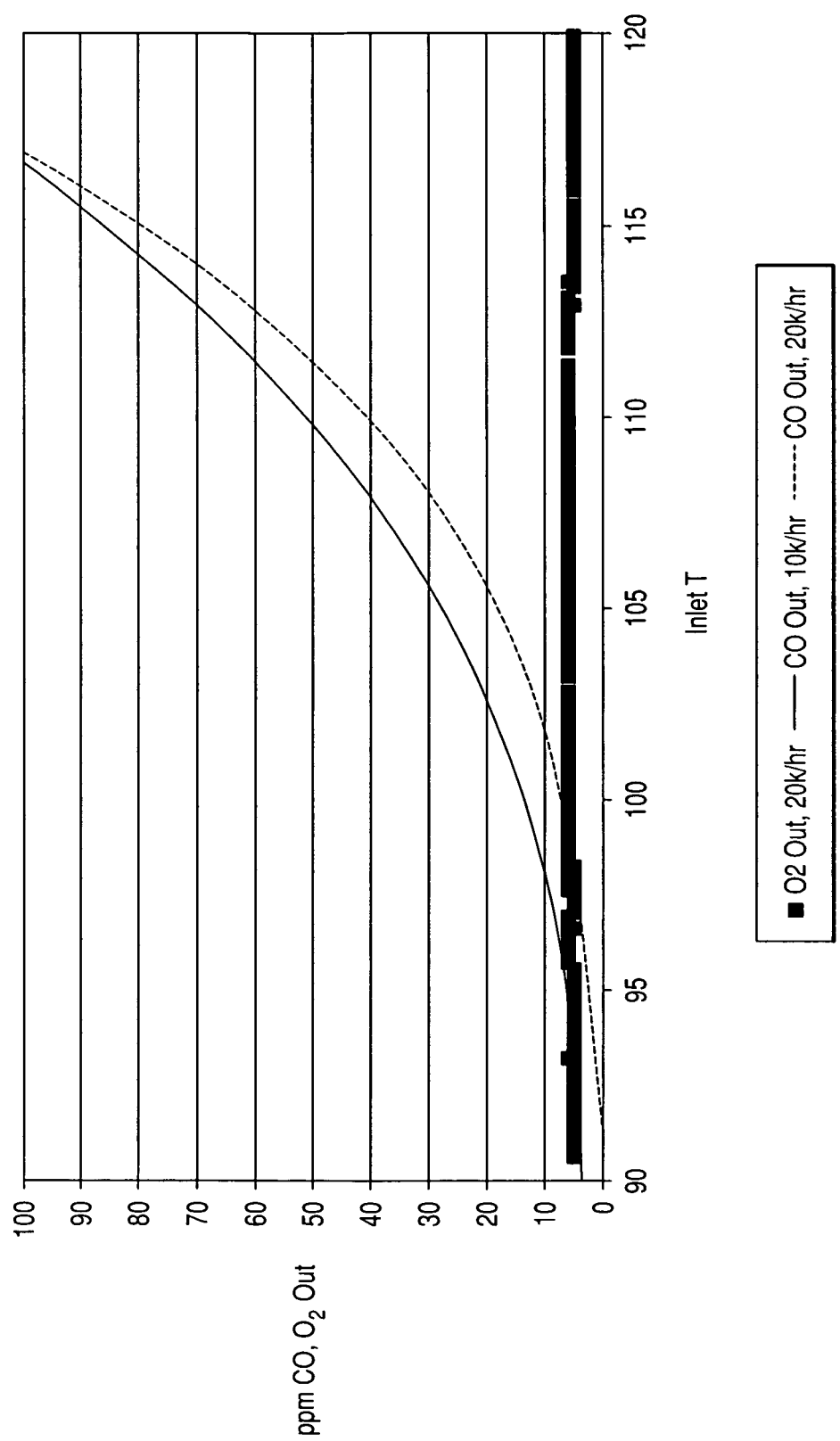
FIG. 7 is a plot of the activity using a PROX catalyst with 2% Pt, 8% Cu and 1% Fe showing the CO and $O_2$ out vs. inlet T.
Figure 8:
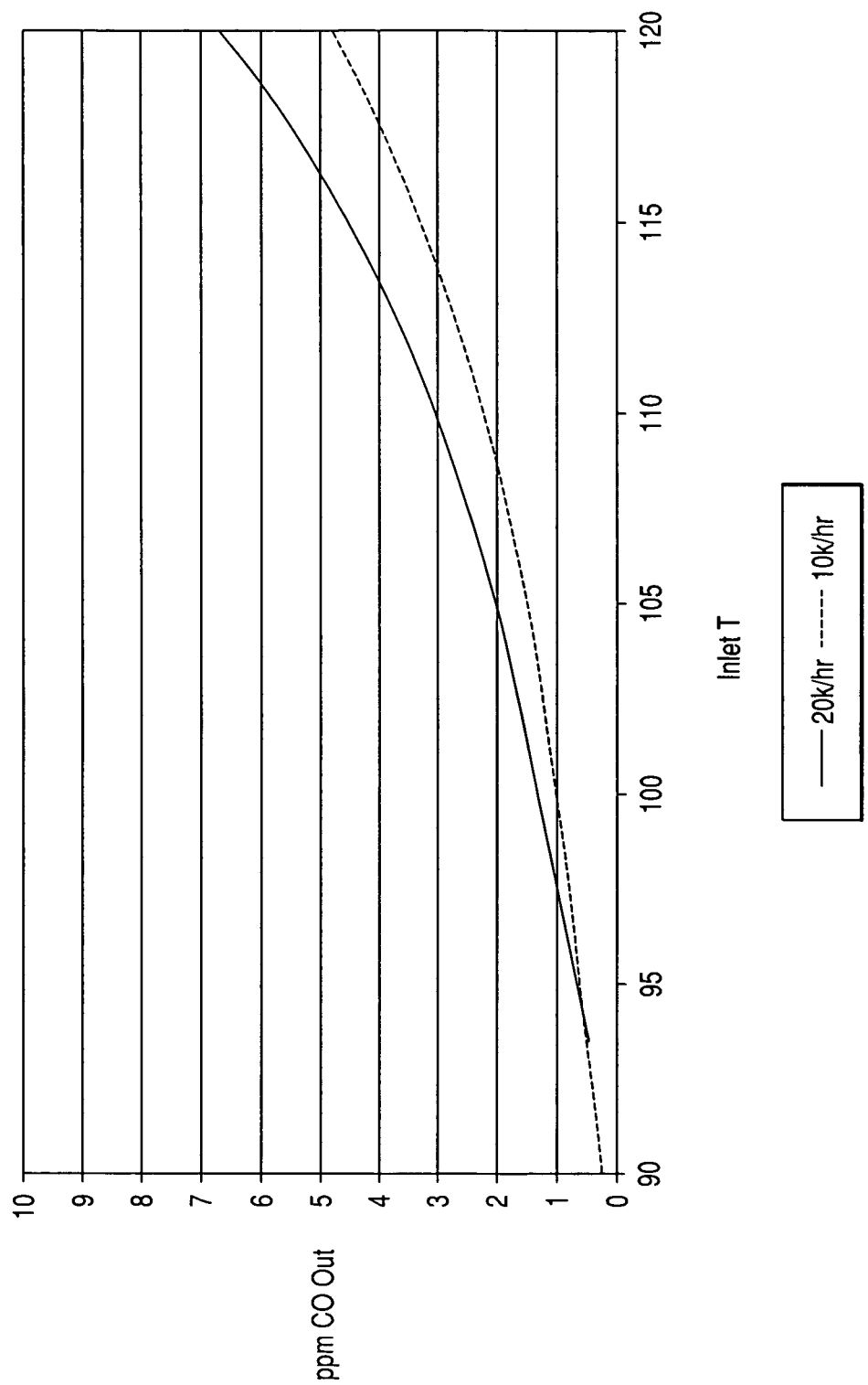
FIG. 8 is a plot of the activity using a PROX catalyst with 2% Pt, 8% Cu and 1% Fe showing the reverse WGS of the CO out vs. inlet T.

The experimental conditions described in Example 5 were repeated. The experiment was performed using the catalyst containing 1% iron with 2% platinum and 8% copper (Example 2). The results for residual CO (and $O_2$ at 20 k/hr) are shown in FIG. 7. FIG. 8 shows the magnitude of reverse WGS at 10 and 20 k/hr, respectively.

EXAMPLE 9

Figure 9:
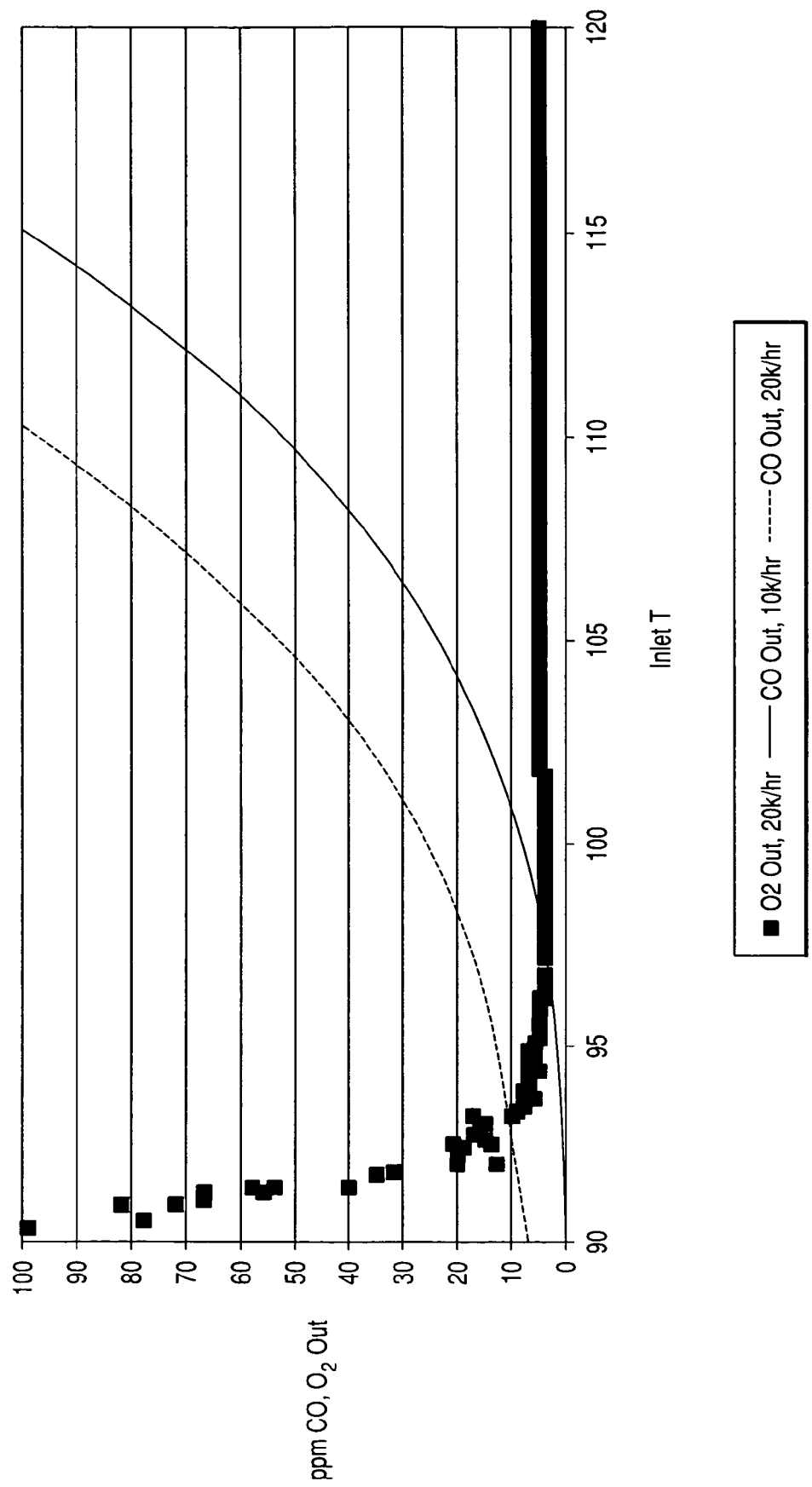
FIG. 9 is a plot of the activity using a PROX catalyst with 2% Pt, 8% Cu and 1.5% Fe showing the CO and $O_2$ out vs. inlet T.
Figure 10:
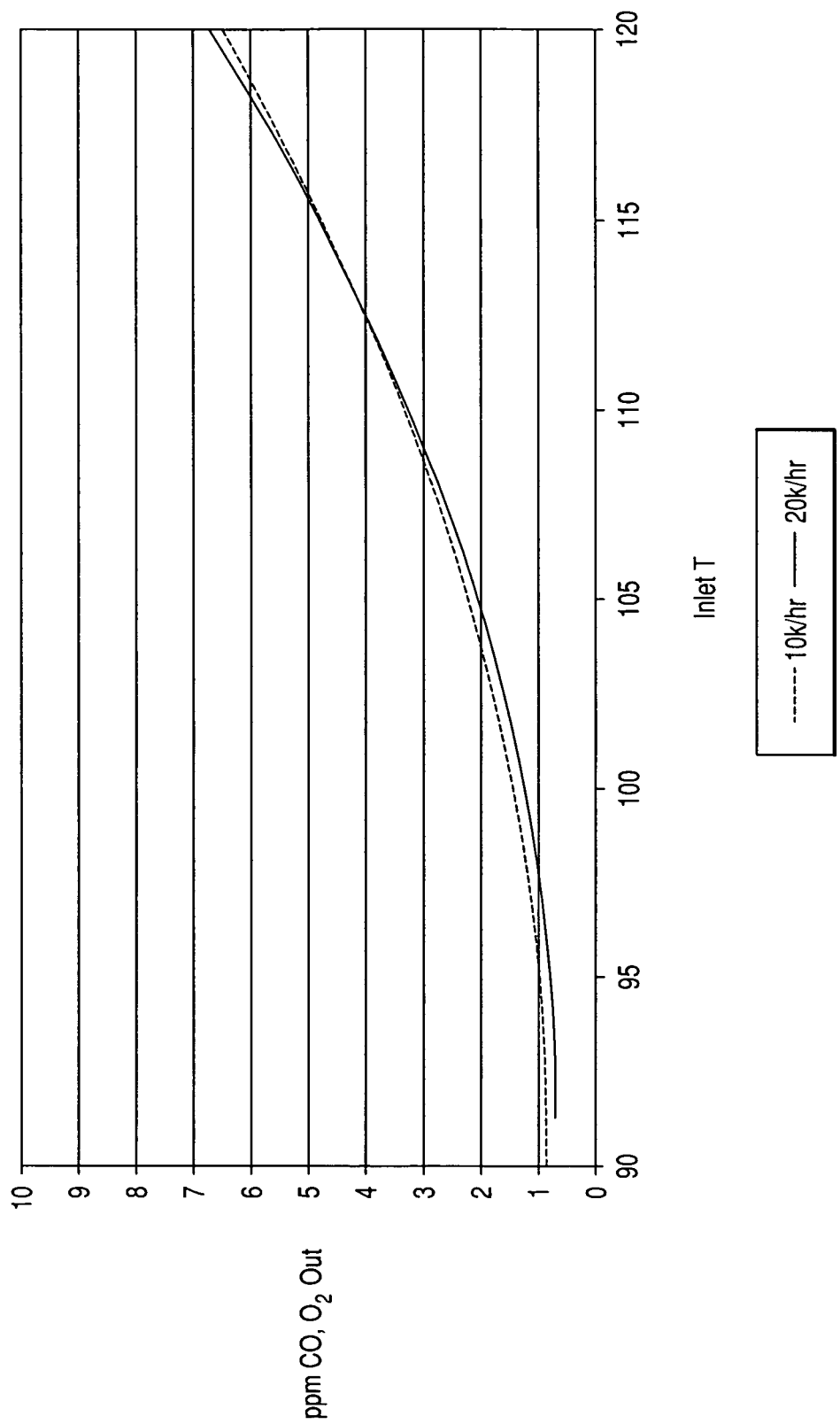
FIG. 10 is a plot of the activity using a PROX catalyst with 2% Pt, 8% Cu and 1.5% Fe showing the reverse WGS of the CO out vs. inlet T.

The experimental conditions described in Example 5 were repeated. The experiment was performed using the catalyst containing 1.5% iron with 2% platinum and 8% copper (Example 2). The results for residual CO (and $O_2$ at 20 k/hr) are shown in FIG. 9. FIG. 10 shows the magnitude of reverse WGS at 10 and 20 k/hr, respectively.

EXAMPLE 10

Figure 11:
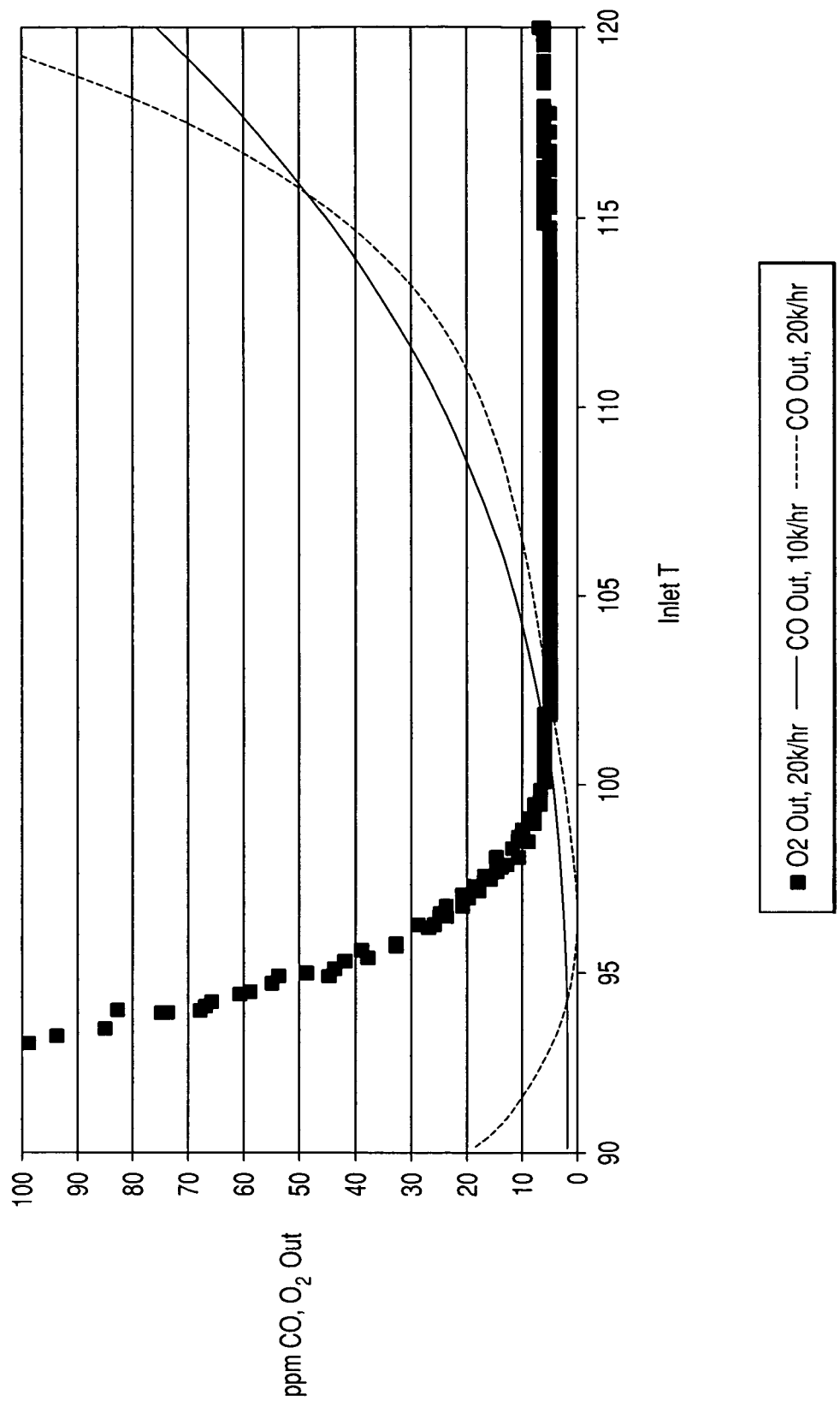
FIG. 11 is a plot of the activity using a PROX catalyst with 2% Pt, 8% Cu and 1% Fe where the Cu and Fe were added in a single impregnation and showing the CO and $O_2$ out vs. inlet T.
Figure 12:
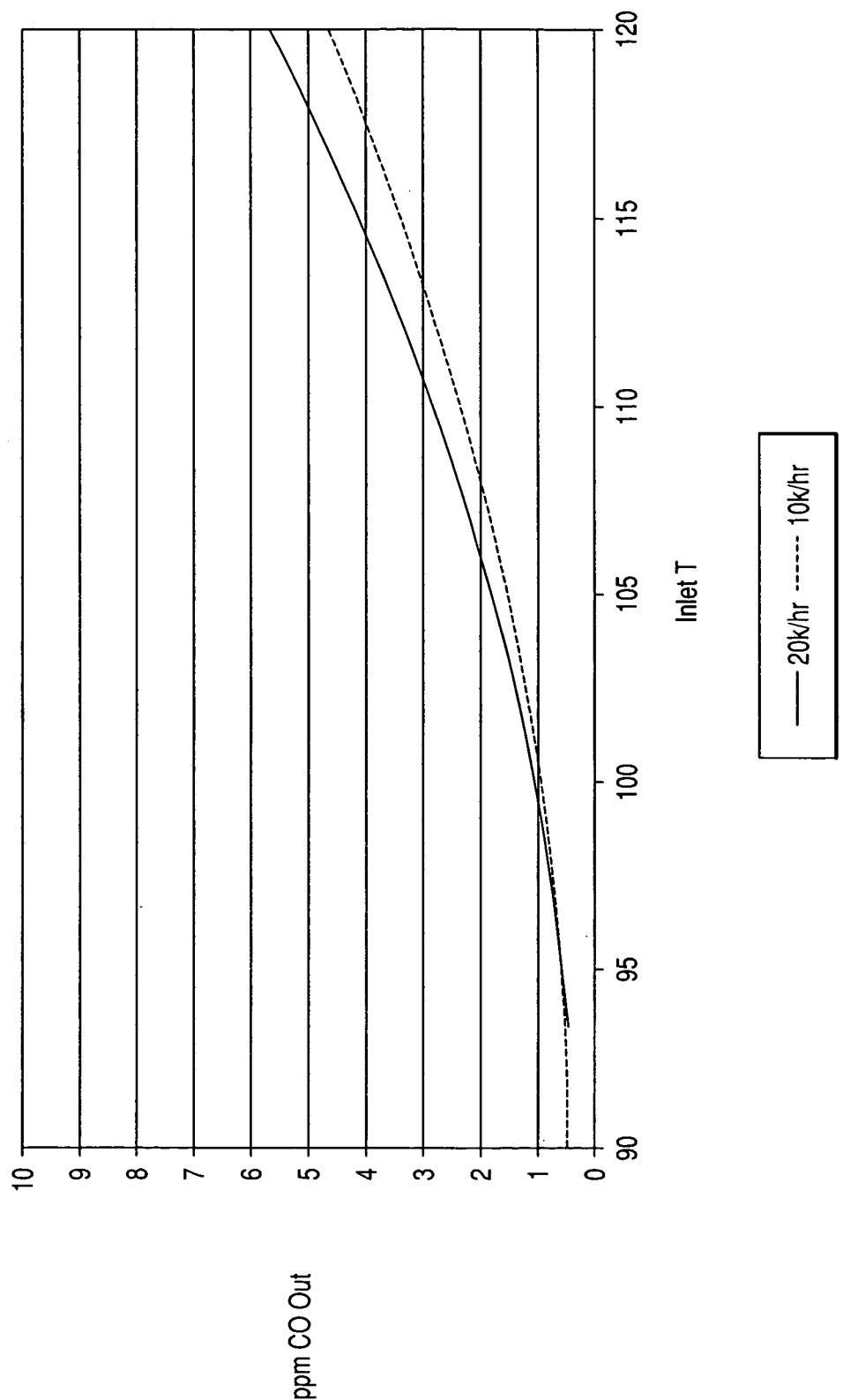
FIG. 12 is a plot of the activity using a PROX catalyst with 2% Pt, 8% Cu and 1% Fe where the Cu and Fe were added in a single impregnation and showing the reverse WGS of the CO out vs. inlet T.

The experimental conditions described in Example 5 were repeated. The experiment is performed using the catalyst containing 1% iron with 2% platinum and 8% copper, where the two base metals are added in a single impregnation (Example 4). The results for residual CO (and $O_2$ at 20 k/hr) are shown in FIG. 11. FIG. 12 shows the magnitude of reverse WGS at 10 and 20 k/hr, respectively.

EXAMPLE 11

Figure 13:
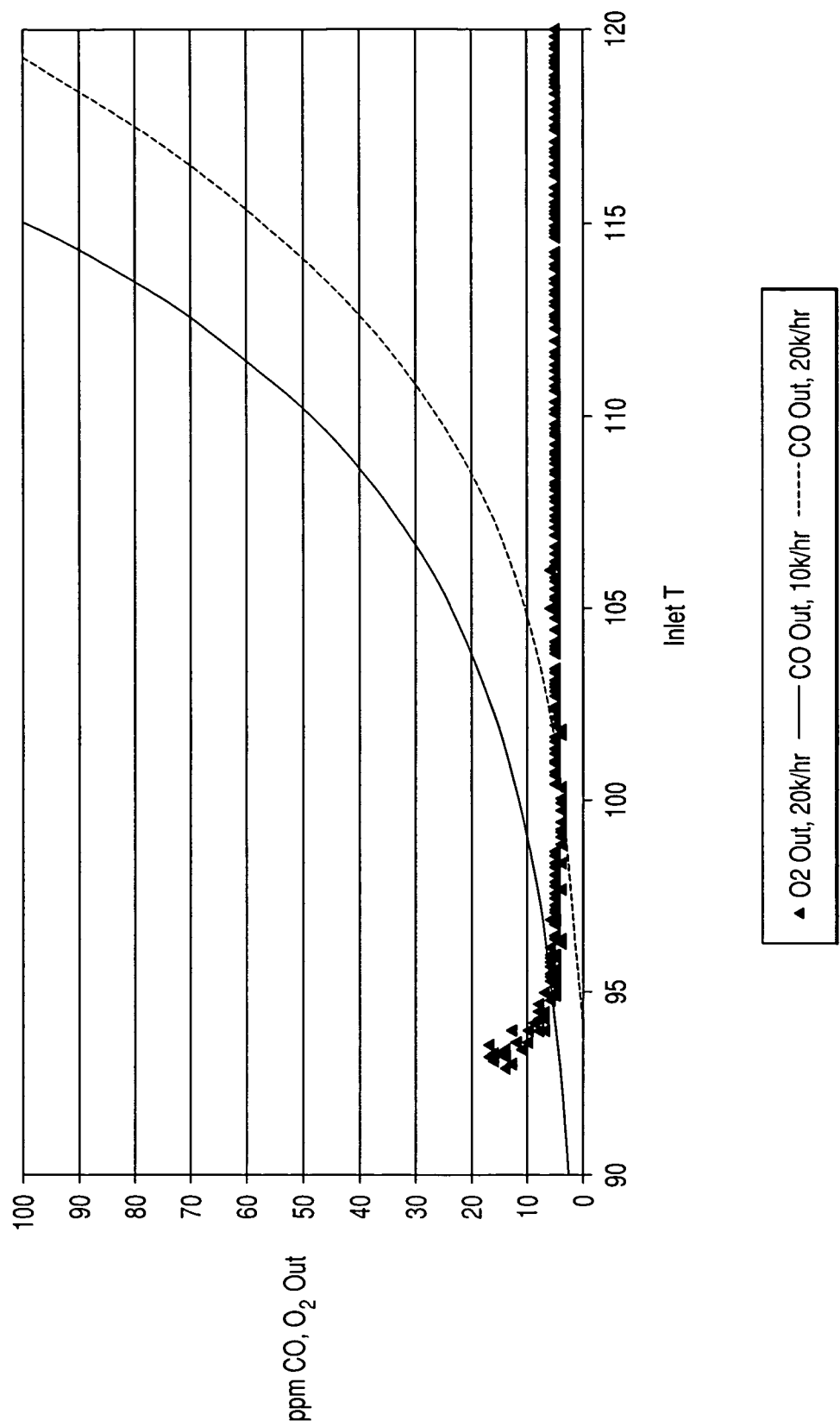
FIG. 13 is a plot of the activity using a PROX catalyst with 2% Pt, 8% Cu and 0.1% Fe showing the CO and $O_2$ out vs. inlet T.
Figure 14:
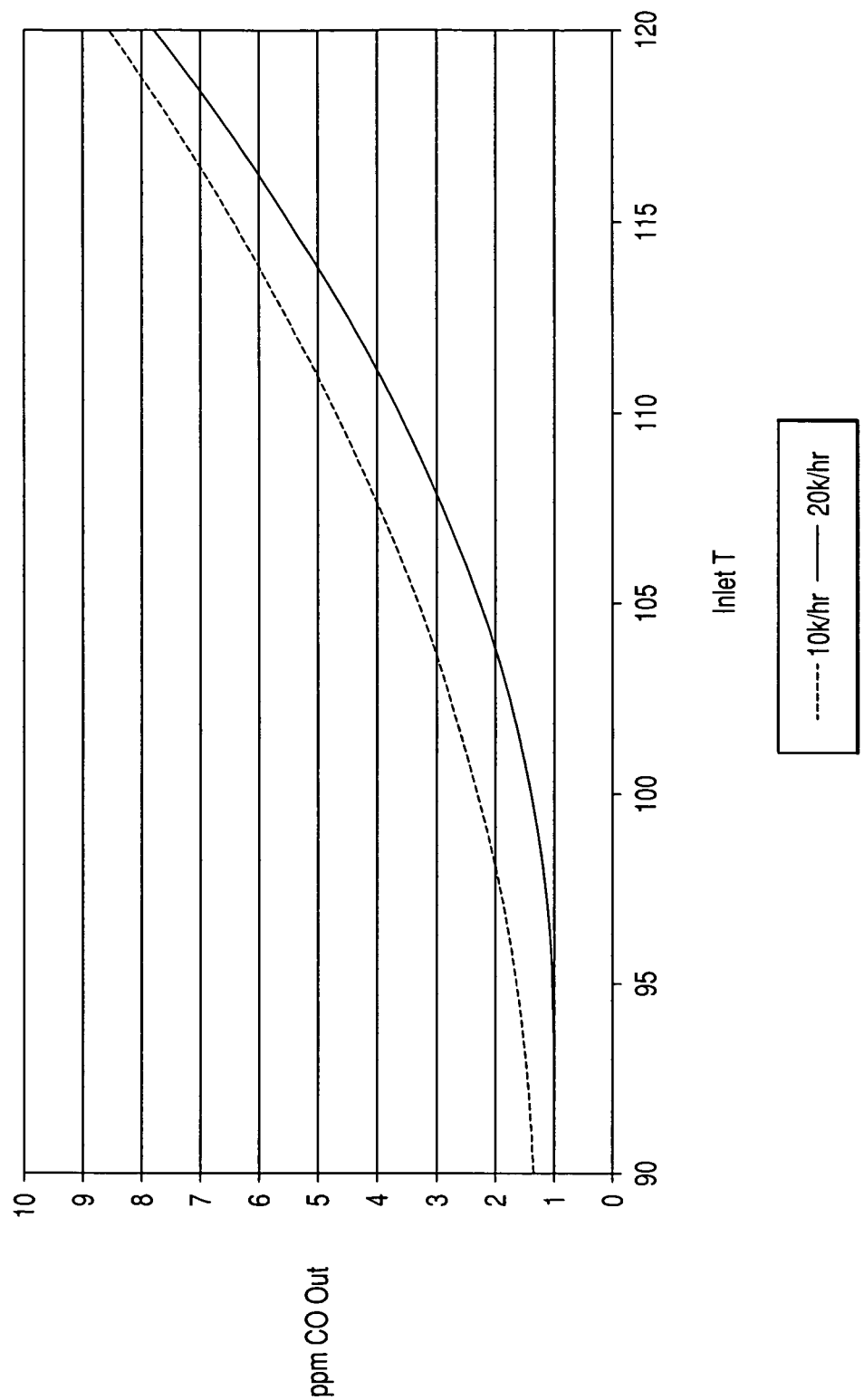
FIG. 14 is a plot of the activity using a PROX catalyst with 2% Pt, 8% Cu and 0.1% Fe showing the reverse WGS of the CO out vs. inlet T.

The experimental conditions described in Example 5 were repeated. The experiment was performed using the catalyst containing 0.1% iron with 2% platinum and 8% copper (Example 2). The results for residual CO (and $O_2$ at 20 k/hr) are shown in FIG. 13. FIG. 14 shows the magnitude of reverse WGS at 10 and 20 k/hr, respectively.

EXAMPLE 12

Figure 15:
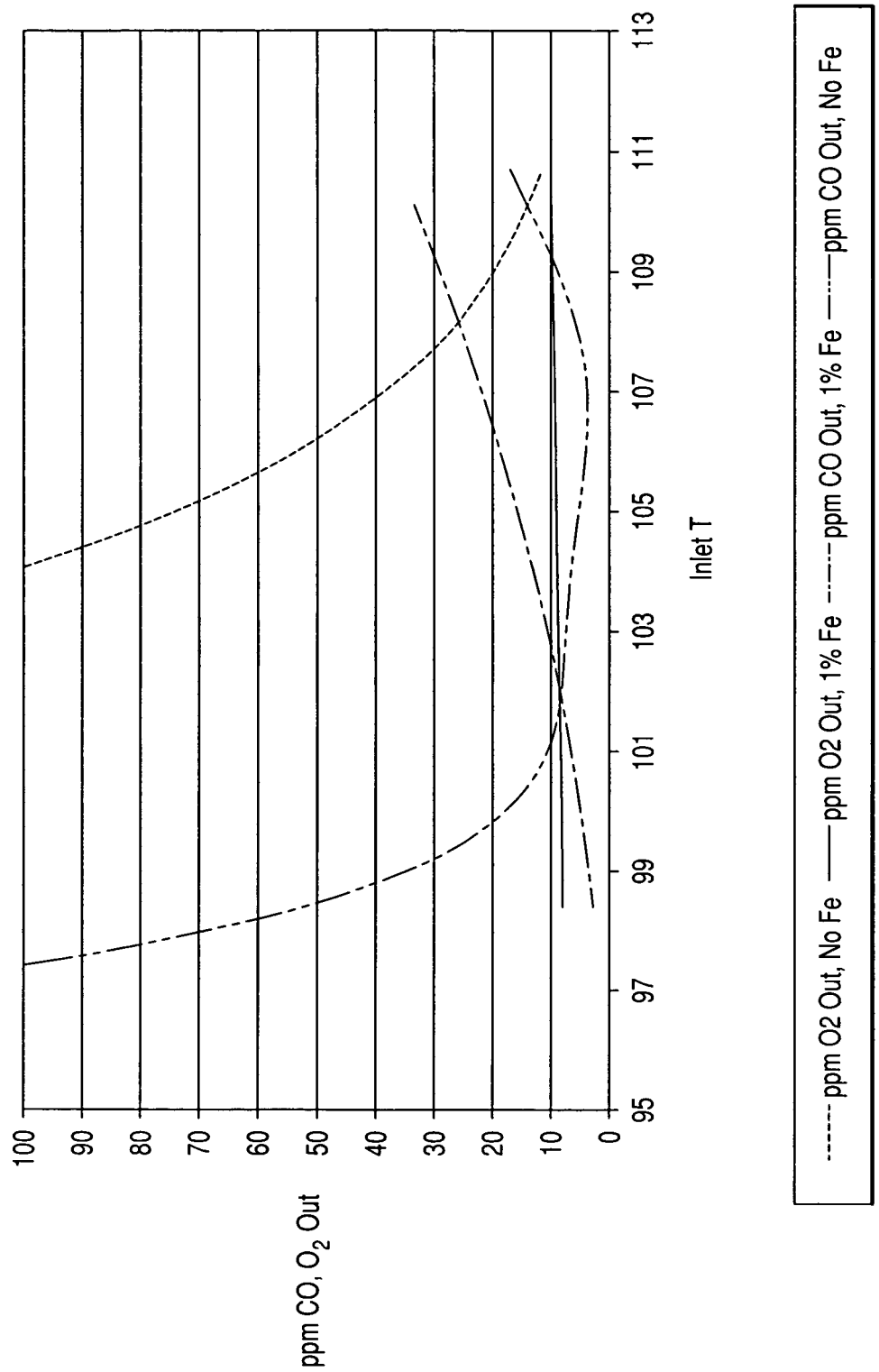
FIG. 15 is a plot of the activity using a Cu/Pt PROX catalyst with and without 1% Fe showing the CO and $O_2$ out vs. inlet T at a space velocity of 27 k/hr.

Operating at 27 k/hr, the catalyst with 2% Pt and 8% Cu (Example 1) was compared with the catalyst that also contained 1% Fe (Example 2). Data was collected for CO and $O_2$ out as a function of inlet temperature. The results are shown in FIG. 15.

The Figures illustrate the advantages that are gained from incorporating iron in a PROX catalyst containing Pt and Cu on a support. The principal advantages are the reduction of the magnitude of intrinsic reverse water gas activity and the "collapse" of the dependency of reverse WGS on space velocity. This is demonstrated by comparing FIG. 2, the base case without any Fe, with FIGS. 6, 8 and 10, which show the CO ppm out for the Pt/Cu catalyst with 0.25%, 1% and 1.5% added Fe, respectively. However, FIG. 14 shows that the change in reverse WGS activity is minimal at 0.1% added iron. In sharp contrast, FIG. 4 shows the relatively high reverse WGS activity for the same level of Pt with 1% Fe added. This demonstrates that the results obtained by adding iron to Pt/copper are not anticipated based on the behavior of iron with platinum in the absence of copper.

The PROX activity of the catalyst is critical. The ppm of CO out for the example of Pt/Cu, shown in FIG. 1, is similar to the results for FIGS. 5 and 7, in which the catalysts included an added 0.25% and 1% Fe, respectively. Slightly poorer results were obtained at 1.5% added Fe, shown in FIG. 9. Also, slightly poorer results are shown in FIG. 11, where the iron is added at the same time in combination with the copper. From the data, the preferred concentration range of Fe is 0.25% to 1%, and the iron is preferably added in a discrete, separate step from the Cu.

Another parameter of comparison is the consumption of added oxygen. In all cases, the oxygen added at a space velocity of 10 k/hr was consumed. However, when runs were at a space velocity of 20 k/hr, the added oxygen started to show some breakthrough. The breakthrough temperature was shown to be related to the amount of added iron. Table 1 shows the relationship of onset of $O_2$ breakthrough with added iron.

TABLE 1

Effect of Catalyst Composition and Fabrication on Breakthrough of Unconsumed Oxygen

| Sample description | $O_2$ breakthrough onset, ° C. | FIG. |
|---|---|---|
| 2% Pt, 8% Cu | 97 | 1 |
| 2% Pt, 8% Cu, 0.1% Fe | 95 | 13 |
| 2% Pt, 8% Cu, 0.25% Fe | <90 | 5 |
| 2% Pt, 8% Cu, 1% Fe | <90 | 7 |
| 2% Pt, 8% Cu, 1.5% Fe | 95 | 9 |
| 2% Pt, 1% Fe | 115 | 3 |
| 2% Pt, 8% Cu, 1% Fe co-impregnation | 100 | 11 |

From Table 1 it can be seen that complete oxygen consumption is achieved at a temperature of <90° C. when iron is added sequentially at 0.25% to 1% in FIGS. 5 and 7. At 0.1% and 1.5% Fe the $O_2$ breakthrough is observed at 95° C. in FIGS. 13 and 9. Thus at the higher Fe level of 1.5% Fe and the lower Fe level of 0.1% Fe the lower operating temperature is not obtained. On the other hand, for the iron free-Pt/Cu catalyst in FIG. 1, $O_2$ breakthrough occurs at a higher temperature of 97° C., and for the catalyst with Fe and Cu co-impregnated in FIG. 11 shows the unreacted $O_2$ at a higher temperature of 100° C. Therefore, the recommended process is to use a catalyst with sequential impregnation of iron and copper and with Fe added at about 0.25 to 1%.

While the invention has been described in detail with reference to particular embodiments thereof, it will be apparent that upon a reading and understanding of the foregoing, numerous alterations to the described embodiments will occur to those of ordinary skill in the art and it is intended to include such alterations within the scope of the appended claims.

What is claimed is:

1. A catalyst suitable as a preferential oxidation catalyst consisting of a support impregnated with catalytic metals platinum, copper, and iron, wherein said platinum is present on the support in an amount of 1-5% by weight, said copper is present on the support in an amount of 8-12% by weight, and said iron is present on the support in an amount of 0.10-2% by weight.

2. A catalyst suitable as a preferential oxidation catalyst according to claim 1, wherein said platinum is present in an amount of 1-3%, said copper is present in an amount of 4-8%, and said iron is present on the support in an amount of 0.2-1.0% by weight.

3. A catalyst suitable as a preferential oxidation catalyst according to claim 1, wherein said platinum is present in an amount of about 2%, said copper is present in an amount of about 8%, and said iron is present in an amount of 0.10-1.5% by weight.

4. A catalyst suitable as a preferential oxidation catalyst according to claim 3, wherein said iron is present in an amount of 0.25-1% by weight.

5. A catalyst suitable as a preferential oxidation catalyst according to claim 1, wherein said support is particulate.

6. A catalyst suitable as a preferential oxidation catalyst according to claim 1, wherein the support is alumina.

7. A catalyst suitable as a preferential oxidation catalyst according to claim 5, wherein said impregnated support is applied as a washcoat on a flow-through monolith.

8. A catalyst suitable as a preferential oxidation catalyst according to claim 7, wherein said monolith is a honeycomb monolith.

9. A catalyst suitable as a preferential oxidation catalyst according to claim 7, wherein said monolith is a foamed metal monolith.

10. A catalyst suitable as a preferential oxidation catalyst according to claim 8, wherein said support is alumina.

11. A catalyst suitable as a preferential oxidation catalyst according to claim 9, wherein said support is alumina.

12. A method for preferentially oxidizing carbon monoxide in a gas stream containing carbon monoxide, hydrogen and oxygen, comprising contacting the gas stream with the catalyst of claim 1.

13. The method of claim 12, wherein said support comprises a flow-through monolith.

14. The method of claim 12, wherein said support is applied a washcoat on a flow-through monolith.

15. The method of claim 14, wherein said support is alumina.

16. The method of claim 12, wherein said gas stream is at a temperature of lower than 200° C.

17. The method of claim 12, wherein said gas stream is at a temperature of up to 125° C.

* * * * *

UNITED STATES PATENT AND TRADEMARK OFFICE
CERTIFICATE OF CORRECTION

PATENT NO.         : 8,445,402 B2
APPLICATION NO.    : 11/142580
DATED              : May 21, 2013
INVENTOR(S)        : Lawrence Shore et al.

It is certified that error appears in the above-identified patent and that said Letters Patent is hereby corrected as shown below:

In the Claims

Col. 12, Claim 2, lines 12-16 should read as follows:
--A catalyst suitable as a preferential oxidation catalyst according to claim 1, wherein said platinum is present in an amount of 1-3%, said copper is present in an amount of 8%, and said iron is present on the support in an amount of 0.2-1.0% by weight.--

Signed and Sealed this
Seventeenth Day of September, 2013

Teresa Stanek Rea
*Deputy Director of the United States Patent and Trademark Office*